US 9,753,977 B2

(12) United States Patent
Seo et al.

(10) Patent No.: US 9,753,977 B2
(45) Date of Patent: Sep. 5, 2017

(54) METHOD AND SYSTEM FOR MANAGING DATABASE

(71) Applicant: NHN Business Platform Corporation, Seongnam-si, Kyunggi-do (KR)

(72) Inventors: Kyung Sik Seo, Guri-si (KR); Ki Eun Park, Bucheon-si (KR)

(73) Assignee: Naver Corporation, Gyeonggi-do (KR)

( * ) Notice: Subject to any disclaimer, the term of this patent is extended or adjusted under 35 U.S.C. 154(b) by 312 days.

(21) Appl. No.: 14/162,353

(22) Filed: Jan. 23, 2014

(65) Prior Publication Data

US 2014/0136515 A1    May 15, 2014

Related U.S. Application Data

(62) Division of application No. 13/265,984, filed as application No. PCT/KR2009/002254 on Apr. 29, 2009, now Pat. No. 8,661,022.

(30) Foreign Application Priority Data

Apr. 24, 2009   (KR) .................. 10-2009-0036163

(51) Int. Cl.
    *G06F 17/30* (2006.01)
(52) U.S. Cl.
    CPC .. G06F 17/30463 (2013.01); G06F 17/30501 (2013.01); *Y10S 707/99934* (2013.01)
(58) Field of Classification Search
    CPC ................. G06F 17/30501; G06F 17/30463

(Continued)

(56) References Cited

U.S. PATENT DOCUMENTS 6,115,703 A *  9/2000  Bireley .............. G06F 17/3048
                                                     707/704
6,321,235 B1* 11/2001  Bird .................. G06F 17/30433
                                                     707/802
(Continued)

FOREIGN PATENT DOCUMENTS

EP        1585036 A2    10/2005

OTHER PUBLICATIONS

International Search Report of PCT/KR2009/002254 issued on Apr. 27, 2010.

*Primary Examiner* — Miranda Le
(74) *Attorney, Agent, or Firm* — Harness, Dickey & Pierce P.L.C.

(57) ABSTRACT

A database management method generates an execution plan with respect to a factorized character string generated by factoring an execution value list of a query and storing the factorized character string and an execution plan identifier associated with the factorized character string. The method includes receiving a factorized character string generated from a query; determining whether the factorized character string is stored in a memory; transmitting an execution plan identifier matching the factorized character string stored in the memory when the factorized character string is stored in the memory; generating and transmitting an execution plan identifier with respect to an execution plan of the factorized character string when the factorized character string is not stored in the memory; receiving a query request consisting of the execution plan identifier and an execution value list included in the query; and providing a query result obtained using the query request.

11 Claims, 4 Drawing Sheets

(58) Field of Classification Search
USPC .................................................. 707/718, 713
See application file for complete search history.

(56) References Cited

U.S. PATENT DOCUMENTS

| | | | |
|---|---|---|---|
| 6,356,887 B1* | 3/2002 | Berenson | G06F 17/30433 |
| 6,466,931 B1* | 10/2002 | Attaluri | G06F 17/30433 |
| 6,526,403 B1 | 2/2003 | Lin et al. | |
| 6,601,064 B1 | 7/2003 | Nag et al. | |
| 6,985,904 B1* | 1/2006 | Kaluskar | G06F 17/30457 |
| 6,999,958 B2* | 2/2006 | Carlson | G06F 17/30474 |
| 7,080,062 B1 | 7/2006 | Leung et al. | |
| 7,289,978 B2* | 10/2007 | Limoges | G06F 17/30404 |
| 7,310,637 B2* | 12/2007 | Dettinger | G06F 17/30427 |
| 7,328,207 B2* | 2/2008 | Dumitru | G06F 17/30433 |
| 7,337,169 B2 | 2/2008 | Galindo-Legaria et al. | |
| 7,337,170 B2* | 2/2008 | Lee | G06F 17/3043 |
| 7,539,660 B2* | 5/2009 | Focazio | G06F 17/30454 |
| 7,640,230 B2* | 12/2009 | Hanson | G06F 17/30463 |
| 7,640,238 B2* | 12/2009 | Mordvinov | G06F 17/30424 |
| 7,734,616 B2* | 6/2010 | Mogi | G06F 17/3048 707/713 |
| 7,877,376 B2* | 1/2011 | Thiyagarajan | G06F 17/30457 707/717 |
| 7,895,191 B2* | 2/2011 | Colossi | G06F 17/30312 707/600 |
| 7,937,385 B2* | 5/2011 | Bestgen | G06F 17/3048 707/713 |
| 7,987,178 B2* | 7/2011 | Hueske | G06F 17/30306 707/713 |
| 8,032,522 B2* | 10/2011 | Goldstein | G06F 17/30474 707/718 |
| 8,060,495 B2* | 11/2011 | Beavin | G06F 17/30463 707/718 |
| 8,086,597 B2* | 12/2011 | Balmin | G06F 17/30938 707/714 |
| 8,290,977 B2* | 10/2012 | Chinchwadkar | G06F 17/30929 707/778 |
| 8,412,720 B2* | 4/2013 | Britton | G06F 17/30536 707/755 |
| 2002/0107835 A1* | 8/2002 | Coram | G06F 17/30457 |
| 2004/0073549 A1* | 4/2004 | Turkel | G06F 17/3046 |
| 2004/0117398 A1 | 6/2004 | Idei et al. | |
| 2004/0162822 A1* | 8/2004 | Papanyan | G06F 17/30442 |
| 2004/0236722 A1 | 11/2004 | Waas et al. | |
| 2004/0236726 A1* | 11/2004 | Ewing | G06F 17/3048 |
| 2005/0097103 A1* | 5/2005 | Zane | G06F 17/30421 |
| 2005/0216451 A1* | 9/2005 | Enzler | G06F 17/30427 |
| 2005/0234878 A1 | 10/2005 | Dettinger et al. | |
| 2006/0074872 A1* | 4/2006 | Gordon | G06F 17/3048 |
| 2006/0294088 A1* | 12/2006 | Stecher | G06F 17/30457 |
| 2007/0192285 A1 | 8/2007 | Wang et al. | |
| 2007/0214104 A1* | 9/2007 | Miao | G06F 17/30463 |
| 2008/0065589 A1* | 3/2008 | Birka | G06F 17/30454 |
| 2008/0065592 A1* | 3/2008 | Doyle | G06F 17/30445 |
| 2008/0091645 A1* | 4/2008 | Gay | G06F 17/3048 |
| 2008/0201295 A1* | 8/2008 | Praveena | G06F 17/3048 |
| 2008/0319958 A1* | 12/2008 | Bhattacharya | G06F 17/30389 |
| 2009/0171895 A1* | 7/2009 | Hackmann | G06F 17/30398 |
| 2010/0005077 A1* | 1/2010 | Krishnamurthy | G06F 17/30463 707/E17.136 |
| 2010/0198855 A1 | 8/2010 | Ranganathan et al. | |

* cited by examiner

METHOD AND SYSTEM FOR MANAGING DATABASE

CROSS REFERENCE RELATED APPLICATIONS

This application is the National Stage Entry of International Application PCT/KR2009/002254, filed on Apr. 29, 2009, and claims priority from and the benefit of Korean Patent Application No. 10-2009-0036163, filed on Apr. 24, 2009, all of which are incorporated herein by reference for all purposes as if fully set forth herein.

BACKGROUND OF THE INVENTION

Field of the Invention

The present invention relates to a method and a system for managing a database, and more particularly to a method and a system for managing a database which are capable of improving a data processing speed.

Discussion of the Background

A database management system (DBMS) is a system for managing a database that stores massive amounts of data and is regarded as being essential in an age in which copious amounts of information are being generated continuously.

The DBMS stores all data in a database in a tabular format. Here, a table refers to a basic structure in which a database stores data and one table includes at least one record.

A record indicates one row of a table and may also be referred to as a tuple. Each record includes at least one column. A column refers to a domain having a name representing a category of a table in a real world, which is also referred to as an attribute or a field.

When a query is input from an external source, the DBMS selects, inserts, updates, or deletes data of the database based on the query.

Here, a query refers to a request made with respect to data stored in a table of a database, describing a process which is desired to be implemented to the data. A query is expressed using a structured query language (SQL) or the like.

Among SQL queries, a representative query is a select statement. The select statement is used to read data in a table, to analyze data to revise the content of the data, or to read desired data with reference being made to data distributed in different tables.

For example, in an SQL statement "SELECT*FROM board WHERE id=10", a SELECT statement denotes a request to demand selection of records corresponding to all columns satisfying "id=10", that is, tuples corresponding to all columns, from a table "board."

When the abovementioned query is input, the DBMS generates an execution plan to determine data extraction methods and procedures in order to extract the data requested by the input query. A conventional DBMS generates a new execution plan for each query whenever a query is input and extracts data based on the generated execution plan.

However, when a query substantially the same as a first query previously input or a second query which has a different particular condition only, e.g., a different execution value list, is input, even though an execution plan for the second query is nearly the same as an execution plan for the first query, the conventional DBMS newly generates the execution plan for the second query, thereby reducing efficiency in managing the system.

Further, when a second query which is substantially the same as the first query previously input is input, the conventional DBMS generates a query result separately with respect to the second query through execution of an execution plan for the second query instead of using a query result with respect to the first query, which is an inefficient method.

SUMMARY OF THE INVENTION

An exemplary embodiment of the present invention discloses a method and a system for managing a database which generates an execution plan with respect to a factorized character string generated by factoring an execution value list of a query, and stores the factorized character string and an execution plan identifier with respect to the factorized character string, matching one another.

Another exemplary embodiment of the present invention discloses a method and a system for managing a database which obtains a result with respect to a query by executing an execution plan and matching a factorized character string stored in a memory, when the factorized character string generated from the query is stored in the memory.

Still another exemplary embodiment of the present invention discloses a method and a system for managing a database which provides a stored result matching a factorized character string, and an execution value list as a result with respect to a query when the factorized character string generated from the query and the execution value list of the query are stored in the memory.

According to an aspect of the present invention, there is provided a method for managing a database, the method including receiving, from a client, a factorized character string generated from a query; determining whether the factorized character string is stored in a memory; transmitting an execution plan identifier, matching the factorized character string stored in the memory, to the client when the factorized character string is stored in the memory, or generating and transmitting an execution plan identifier with respect to an execution plan of the factorized character string to the client when the factorized character string is absent in the memory; receiving a query request consisting of the execution plan identifier and an execution value list included in the query from the client; and providing a query result obtained using the query request to the client.

Here, when the factorized character string is not stored in the memory, the transmitting of the execution plan identifier includes responding to the factorized character string to the client; receiving an execution plan, generated by the client, from the client; and generating and transmitting an execution plan identifier with respect to the received execution plan to the client.

The method may further include storing the generated execution plan identifier in the memory matching the factorized character string.

In one exemplary embodiment, the method may further include determining whether a query result identifier matching the query request is stored in the memory before providing the query result, wherein the providing of the query result obtains the query result corresponding to the query result identifier from the memory or a disk and provides the query result to the client when the query result identifier matching the query request is stored, and the providing of the query result provides, to the client, the query result obtained by executing the execution plan corresponding to the execution plan identifier, using the execution value list, when the query result identifier matching the query request is absent.

Here, the execution plan corresponding to the execution plan identifier is obtained directly from the memory or obtained by decoding an execution plan in a stream format stored in the disk when the query result identifier matching the query request is not stored.

The method may further include generating a query result identifier to identify a query result obtained by executing the executing plan; and storing the query result identifier, the query request, and the factorized character string in the memory, matching one another.

In one exemplary embodiment, the method may further include generating a query table in which the factorized character string, the query request, and the query result identifier to identify the query result with respect to the query request are recorded, matching one another. In this instance, the method may further include updating the query table when a table corresponding to table information included in the factorized character string is changed.

The factorized character string is obtained by converting the execution value list included in the query into a predetermined factor.

According to another aspect of the present invention, there is provided a method for managing a database, the method including generating a factorized character string from a query received from a user; transmitting the factorized character string to a server; receiving an execution plan identifier with respect to the factorized character string from the server; transmitting a query request consisting of the execution plan identifier and an execution value list included in the query to the server; and receiving a query result with respect to the query request from the server.

Here, before the receiving the execution plan identifier, the method may further include generating an execution plan with respect to the factorized character string when a response to the factorized character string is received from the server; and transmitting the generated execution plan to the server.

According to still another aspect of the present invention, there is provided a system for managing a database, the system including an interface module interfacing with a client; a determination module determining whether a factorized character string generated from a query is stored in a memory; an execution plan identifier management module transmitting an execution plan identifier matching the factorized character string stored in the memory to the client when the factorized character string is stored in the memory, or generating and transmitting an execution plan identifier with respect to an execution plan of the factorized character string to the client when the factorized character string is not stored in the memory; and a query result obtaining module obtaining a query result with respect to a query request and providing the query result to the client when the query request consisting of the execution plan identifier and an execution value list included in the query is received from the client.

According to yet another aspect of the present invention, there is provided a system for managing a database, the system including a character string generation module generating a factorized character string from a query received from a user; a query request generation module generating a query request consisting of an execution plan identifier and an execution value list included in the query when the execution plan identifier with respect to the factorized character string is received from a server; and an interface module transmitting the factorized character string and the query request to the server and receiving the execution plan identifier and a query result with respect to the query request from the server.

According to exemplary embodiments of the present invention, a method and a system for managing a database generate an execution plan with respect to a factorized character string generated by factoring an execution value list of a query and store the factorized character string and an execution plan identifier with respect to the factorized character string, matching one another, thereby efficiently using memory resources when compared to when a query and an execution plan identifier with respect to the query are stored, matching one another.

Further, a method and a system for managing a database obtains a result with respect to a query by executing an execution plan matching a factorized character string stored in a memory, instead of generating a new execution plan with respect to the query, when the factorized character string generated from the query is stored in the memory. Accordingly, a speed of the system is improved.

In addition, a method and a system for managing a database provides a stored result matching a factorized character string and an execution value list as a result with respect to a query, instead of generating a new execution plan with respect to the query or executing the generated execution plan, when the factorized character string generated from the query and the execution value list of the query are stored in the memory. Thus, a speed of the system is further increased.

DETAILED DESCRIPTION OF THE ILLUSTRATED EMBODIMENTS

Figure 1:
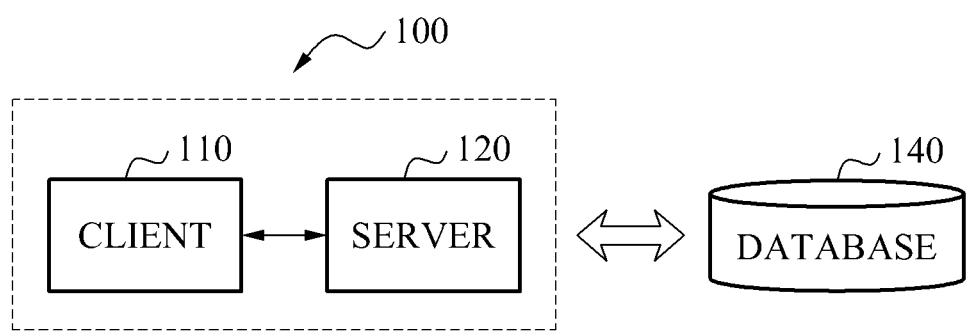
FIG. 1 illustrates a configuration of a database management system according to an exemplary embodiment of the present invention.

Reference will now be made in detail to exemplary embodiments of the present invention, examples of which are illustrated in the accompanying drawings, wherein like reference numerals refer to the like elements throughout. The embodiments are described below in order to explain the present invention by referring to the figures.

FIG. 1 illustrates a configuration of a database management system according to an exemplary embodiment of the present invention.

Figure 2:
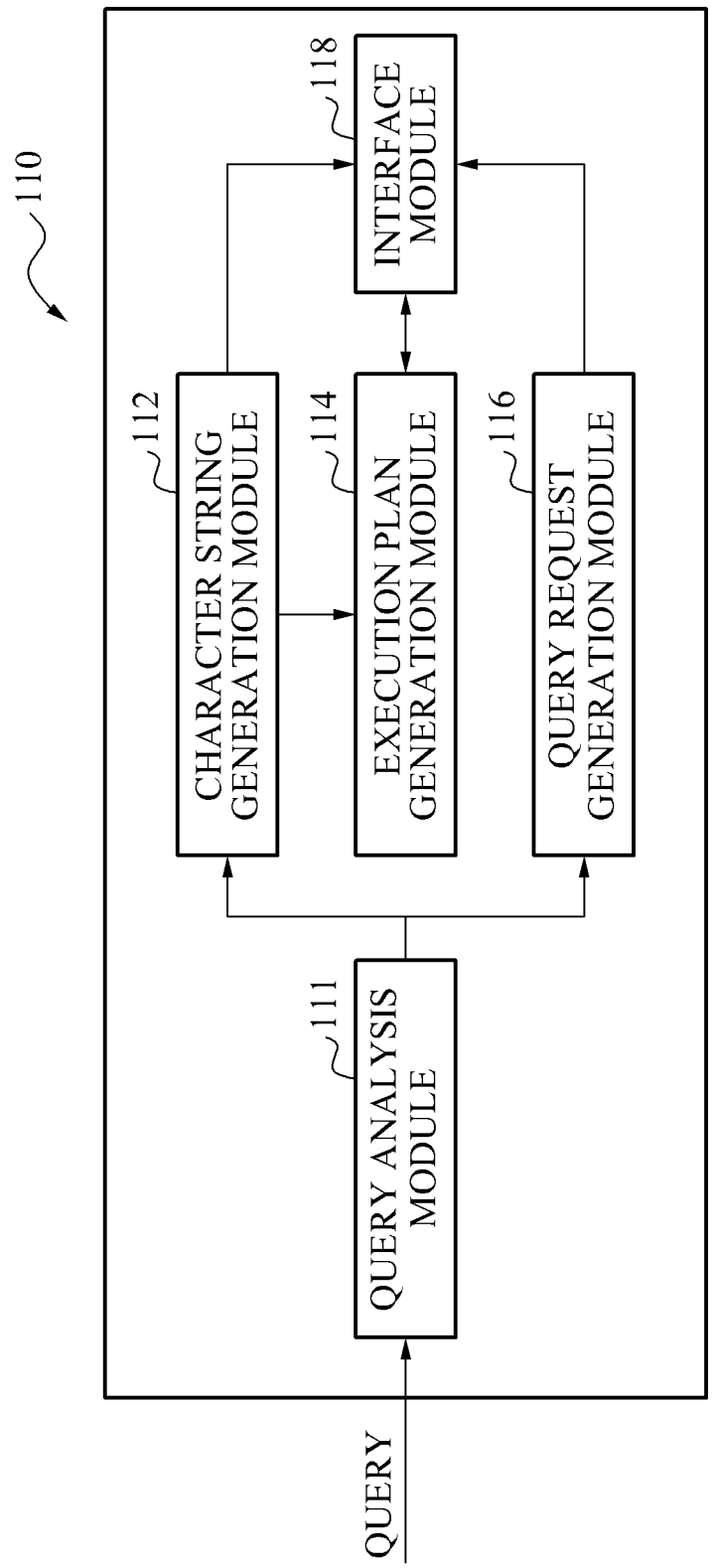
FIG. 2 is a block diagram illustrating a detailed configuration of a client shown in FIG. 1.

FIG. 2 is a block diagram illustrating a detailed configuration of a client shown in FIG. 1

Figure 3:
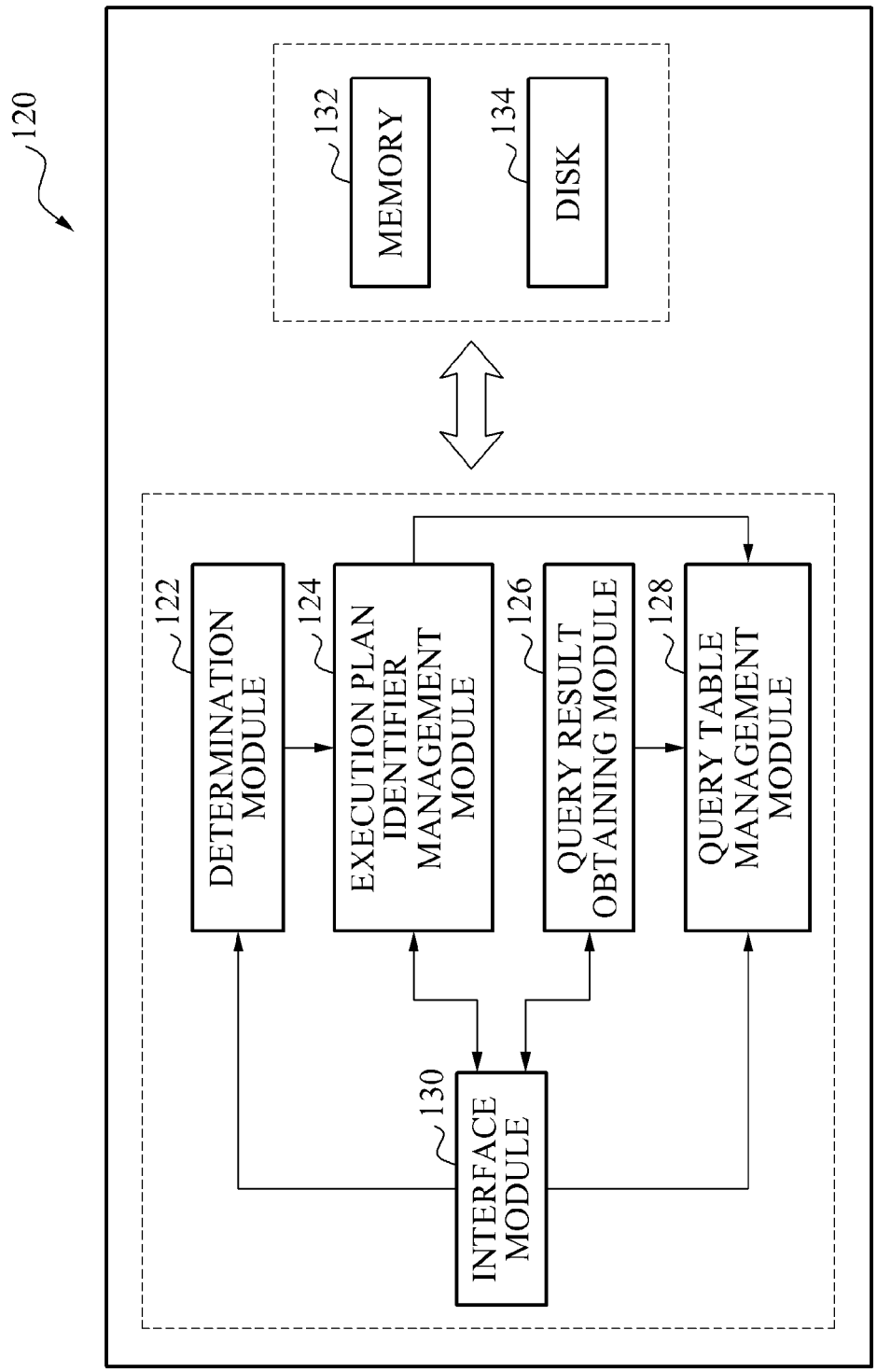
FIG. 3 is a block diagram illustrating a detailed configuration of a server shown in FIG. 1.

FIG. 3 is a block diagram illustrating a detailed configuration of a server shown in FIG. 1.

As shown in FIG. 1, the database management system 100 may include a client 110 and a server 120. The database management system 100 is connected to a database 140 to manage the database 140 overall, for example, updating or deleting data recorded in the database 140 or adding data to the database 140.

First, the client 110 receives a query from a user, generates an execution plan for the query, and transmits the plan to the server 120. As shown in FIG. 2, the client 110 includes a query analysis module 111, a character string generation module 112, an execution plan generation module 114, a query request generation module 116, and a server interface module 118.

The query analysis module 111 receives a query from a user, parses the query, and analyzes the query through a semantic check. Here, the query denotes a character string which defines a data extraction request to extract data satisfying a particular condition from a particular table stored in the database 140. In one exemplary embodiment, the query may be generated using a structured query language (SQL) sentence.

For example, a query defining a request for extraction of information about an employee corresponding to a particular identification (ID) number from the database 140 is written in an SQL sentence as follows.

1) SELECT*FROM EMPLOYEE WHERE EMPNO=2106

This query is a SELECT sentence which defines extraction of information about an employee having an ID number of 2106, wherein "*" denotes all information about an employee to be extracted (for example, all columns included in a tuple corresponding to the ID number of 2106), "EMPLOYEE" denotes a table in which a corresponding tuple is recorded, and "EMPNO=2106" indicates that an ID number is "2106."

The character string generation module 112 generates a factorized character string from a query analyzed by the query analysis module 111. In one exemplary embodiment, the character string generation module 112 may generate a factorized character string by converting an execution value list (here, the term "execution value list" is used since a plurality of execution values may exist), such as constants or binding variables, of a query analyzed by the query analysis module 111 into a predetermined factor.

For example, when the query is "SELECT*FROM EMPLOYEE WHERE EMPNO=2106," the execution value list is "2106." Thus, the execution value is converted into a predetermined factor "?," thereby generating a factorized character string "SELECT*FROM EMPLOYEE WHERE EMPNO=?."

The reason for the character string generation module 112 generating a factorized character string from a query is that when an execution plan is generated with respect to a generalized character string obtained by converting an execution value list into a particular factor, just one execution plan may be generated with respect to queries having different execution value lists only, thereby preventing a waste of resources in generation of an execution plan. Conventionally, since a separate execution plan is generated with respect to each query having a different execution value list, a great amount of resources are consumed.

The character string generation module 112 transmits the factorized character string to the server 120 through the interface module 118, allowing the server 120 to determine whether generation of an execution plan with respect to the factorized character string is requested.

Next, when receiving a response to a factorized character string from the server 120, the execution plan generation module 114 generates an execution plan with respect to the factorized character string. Here, the execution plan denotes a data structure including a method or procedure of extracting a tuple corresponding to a particular condition from a particular table.

In one exemplary embodiment, the response to the factorized character string may be transmitted from the server 120 through the interface module 118 when the factorized character string is determined not to be stored in the server 120.

That is, the factorized character string is stored in the server 120 means that an execution plan with respect to the factorized character string is already generated. Further, when the factorized character string is not stored in the server 120, it is necessary to generate an execution plan.

In one exemplary embodiment, when "Null" is received as a response to transmission of the factorized character string from the server 120, the execution plan generation module 114 determines to generate an execution plan with respect to the factorized character string.

Next, when an execution plan identifier with respect to the factorized character string is received as a response to transmission of the factorized character string or as a response to transmission of an execution plan from the server 120 through the interface module 118, the query request generation module 116 generates a query request using the execution plan identifier transmitted from the server 120 and the execution value list included in the query received through the query analysis module 111.

Regarding the execution plan identifier with respect to the factorized character string, when the factorized character string is stored in the server 120, the execution plan identifier with respect to the factorized character string is immediately provided by the server 120 as a response to transmission of the factorized character string. However, when the factorized character string is not stored in the server 120, the execution plan generation module 114 generates and transmits an execution plan with respect to the factorized character string to the server 120 so that the server 120 generates and provides an execution plan identifier with respect to the execution plan.

In one exemplary embodiment, the query request generation module 116 may generate an execution plan identifier transmitted from the server 120 and an execution value list included in a query in a pair format.

For example, when a query is "SELECT*FROM EMPLOYEE WHERE EMPNO=2106" and "P" is transmitted from the server 120 as an execution plan identifier with respect to a generalized character string "SELECT*FROM EMPLOYEE WHERE EMPNO=?," an execution value included in the query is "2106," and thus the query request generation module 116 transmits a query request in a pair format, for example, {P, 2106}, to the server 120.

Thus, according to the present invention, the query request generation module 116 considerably reduces the amount of information included in a query request when compared to a conventional method of transmitting an execution plan as a query request, thereby decreasing a network load occurring when retrieving an enormous amount of data.

The interface module 118, which functions to interface with the server 120, transmits a factorized character string generated by the character string generation module 112 to the server 120 and receives a response to transmission of the factorized character string from the server 120.

Here, as described in the foregoing, the response to transmission of the factorized character string may be an execution plan identifier with respect to the factorized character string when the factorized character string is stored in the server 120. Further, the response may be a response such that the factorized character string is not stored in the server 120 when the factorized character string is not stored in the server 120.

When the response to transmission of the factorized character string is received from the server 120, the interface module 118 transmits the response to the execution plan generation module 114. When an execution plan identifier is transmitted, the interface module 118 transmits the execution plan identifier to the query request generation module 116.

Further, the interface module 118 converts an execution plan generated by the execution plan generation module 114 into a stream format to transmit to the server 120 and receives an execution plan identifier with respect to the execution plan generated by the execution plan generation module 114 from the server 120 to transmit to the query request generation module 116.

In addition, the interface module 118 transmits a query request generated by the query request generation module 116 to the server 120 and receives a query result corresponding to the query request from the server 120 to provide to a user.

In one exemplary embodiment, the client 110 including the aforementioned modules may be programmed and installed in a user terminal (not shown). Alternatively, the client 110 may be installed in the server 120.

Referring to FIG. 1, the server 120 stores and executes an execution plan generated by the client 110 and provides a query result obtained by execution of the execution plan to the client 110.

As shown in FIG. 3, the server 120 may include a determination module 122, an execution plan identifier management module 124, a query result obtaining module 126, a query table generation module 128, an interface module 130, a memory 132, and a disk 134.

The determination module 122 determines whether a factorized character string received from the client 110 is recorded in a management table of the memory 132 and transmits a result to the execution plan identifier management module 122. That is, the determination module 122 determines whether the factorized character string received from the client 110 is a previously received character string.

In one exemplary embodiment, the determination module 122 may determine whether the factorized character string exists in a query table generated by the query table generation module 128 and stored in the memory 132.

When the determination module 122 determines that the factorized character string is stored in the query table, the execution plan identifier management module 124 transmits an execution plan identifier matching the factorized character string, stored in the query table, to the client 110 through the interface module 130.

That is, as described in the foregoing, since that the factorized character string is stored in the query table means that the factorized character string is a previously received character string, an execution plan and an execution plan identifier with respect to the factorized character string are already generated, and thus the execution plan identifier management module 124 provides the stored execution plan identifier matching the factorized character string to the client 110.

When the determination module 122 determines that the factorized character string is not stored in the query table, the execution plan identifier management module 124 transmits a corresponding response. In one exemplary embodiment, the execution plan identifier management module 124 may transmit "Null" to the client 110 as a response to transmission of the factorized character string.

Then, when receiving an execution plan with respect to the factorized character string from the client 110, the execution plan identifier management module 124 stores the execution plan in a stream format received from the client 110 as a file in the disk 134 and generates an execution plan identifier with respect to the execution plan to transmit to the client 110.

In one exemplary embodiment, the execution plan identifier management module 124 may determine an identifier of the file storing the execution plan as the execution plan identifier.

The execution plan identifier management module 124 transmits the generated execution plan identifier to the query table management module 128, so that the execution plan identifier is recorded in the query table, matching the factorized character string.

Next, the query result obtaining module 126 obtains a query result with respect to a query request transmitted from the client 110 and provides the result to the client 110 through the client interface module 130. Here, as described in the foregoing, the query request denotes a text including an execution plan identifier with respect to a factorized character string and an execution value list included in a query, defined in a pair format, and the query result may be a group of one tuple or a plurality of tuples.

In detail, the query result obtaining module 126 determines whether a query result identifier matching the query request received from the client 110 is recorded in the query table stored in the memory 132. When the query result identifier matching the query request is recorded in the query table, the query result obtaining module 126 obtains a query result corresponding to the query result identifier from the memory 132 or the disk 134 and provides the result to the client 110.

As described in the foregoing, the query result identifier matching the query request is stored in the query table means that the query request is a previously input query request, and thus the query result with respect to the query request is already stored in the memory 132 or the disk 134. Thus, it is not necessary to decode an execution plan stored in the disk 134 or to execute a decoded execution plan in order to obtain a query result with respect to the query request.

Accordingly, in the present exemplary embodiment, when the same query request is made, a previously generated query result with respect to the query request is used, thereby improving a data retrieval speed.

However, when the query result identifier matching the query request is not recorded in the query table, the query result obtaining module 126 determines whether an execution plan corresponding to an execution plan identifier included in the query request is stored in the memory 132.

As a result of determination, when the execution plan is not stored in the memory 132, the query result obtaining module 126 reads an execution plan in a stream format corresponding to the execution plan identifier included in the query request from the disk 134 and stores the execution plan in the memory 132 via decoding. Then, the query result obtaining module 126 executes the decoded execution plan using an execution value list included in the query request to obtain a query result from the database 140 and stores the result in the disk 134.

As a result of determination, when the execution plan is stored in the memory 132, the query result obtaining module 126 executes the execution plan already stored in the memory 132 using an execution value list included in the query request to obtain a query result from the database 140 and stores the result in the disk 134.

In one exemplary embodiment, when storing the obtained query result in the disk 134, the query result obtaining module 126 generates a query result identifier with respect to the query result and provides the query result identifier to the query table generation module 128, so that the query result identifier is recorded in the query table.

As described in the foregoing, when the query result identifier matching the query request is not being stored in the query table means that the query request is a first input query request. Thus, the query result with respect to the query request is obtained using the execution plan corresponding to the execution plan identifier included in the query request and the execution value list included in the query request.

Thus, according to the present invention, even though a query result identifier matching a query request is not recorded in a query table, a previous execution plan stored in the memory 132 or the disk 134 is used, instead of generating a new execution plan, in order to obtain a query result with respect to the query request, thereby improving performance of the database management system 100.

Next, the query table management module 128 matches and records a factorized character string transmitted from the client 110, an execution plan identifier with respect to the factorized character string generated by the execution plan identifier management module 124, an execution value list included in a query, and a query result identifier with respect to a query request in a query table stored in the memory 132.

Further, when a new query result identifier is generated with reception of a new factorized character string or a new execution value list, the query table management module 128 updates the query table.

In one exemplary embodiment, the query table management module 128 may record factorized character strings in the query table in a format of {factorized character string, execution plan identifier, {$1^{st}$ execution value list, $1^{st}$ query result identifier}, {$2^{nd}$ execution value list, $2^{nd}$ query result identifier}, . . . , {$N^{st}$ execution value list, $N^{st}$ query result identifier}}.

When a table associated with a factorized character string is changed in the database 140 due to addition, deletion, or updating of data, the query table management module 128 may delete data associated with the factorized character string, e.g., a record of the factorized character string, from the query table.

As described in the foregoing, the query table management module 128 matches and stores an execution plan identifier, an execution value list, and a query result identifier by each factorized character string generated by factorizing an execution value list of each query, thereby using memory resources efficiently.

The interface module 130, which functions to interface with the client 110, receives a factorized character string from the client 110 to transmit to the determination module 122 and the query table management module 128 and receives an execution plan identifier matching the factorized character string or an execution plan generation request with respect to the factorized character string as a response from the execution plan identifier generation module 124 to provide to the client 110.

Further, the interface module 130 receives an execution plan with respect to the factorized character string from the client 110 to transmit to the execution plan identifier management module 124 and transmits an execution plan identifier generated by the execution plan identifier management module 124 to the client 110.

In addition, the interface module 130 receives a query request consisting of an execution plan identifier and an execution value list from the client 110 to transmit to the query result obtaining module 126 and provides a query result obtained by the query result obtaining module 126 to the client 110.

The memory 132 records a query table generated by the query table generation module 128, stores an execution plan decoded by the query result obtaining module 126, and stores a query result obtained by the query result obtaining module 126 executing the decoded execution plan using an execution value list. In one exemplary embodiment, the memory 132 may store N execution plans or query results which are only recently used among execution plans and query results.

The disk 134 stores an execution plan transmitted from the client 110 and stores query results with respect to a query request.

The database 140 stores various data in a table format, wherein each table may include at least one tuple and each tuple may include at least one column. For example, in a database which stores information about employees of a company, a table denotes a group of information about the employees, a tuple denotes information about each employee, and a column denotes an area in which an ID number of an employee, a name of an employee, a position of an employee, an annual salary of an employee, or the like.

Hereinafter, a method of the database management system 10 processing queries will be described with reference to an illustrative example.

First, when the query analysis module 111 receives a query "SELECT*FROM EMPLOYEE WHERE EMPNO=2106," the character string generation module 112 generates a factorized character string "SELECT*FROM EMPLOYEE WHERE EMPNO=?" from the received query and transmits the factorized character string to the determination module 122.

Then, the determination module 122 determines whether the factorized character string is recorded in a query table of the memory 132. Assuming that the factorized character string is not recorded in the query table, the execution plan identifier management module 124 transmits a corresponding response to the execution plan generation module 114.

Subsequently, when the execution plan generation module 114 generates an execution plan with respect to the factorized character string and transmits the execution plan to the execution plan identifier management module 124, the execution plan identifier management module 124 stores the execution plan in the disk 134 and generates an execution plan identifier "P" with respect to the execution plan to transmit to the query request generation module 116.

Next, the query request generation module 116 generates a query request in a pair format, e.g., {P, 2106}, using the execution plan identifier "P" transmitted from the execution plan identifier management module 124 and an execution value list "2106" included in the query and transmits the query request to the query result obtaining module 126.

Then, the query result obtaining module 126 determines whether a query result identifier matching the received query request exists in the query table. In this example, since the query is a first input query, a query result corresponding to the query does not exist in the memory 132 or the disk 134. Thus, the query result obtaining module 126 obtains a query result by reading an execution plan corresponding to the execution plan identifier "P" from the disk 134, by storing the execution plan in the memory 132 via decoding, and then by executing the decoded execution plan using the execution value list "2106," and transmits the obtained query result to the client 110.

Next, the query result obtaining module 126 imparts a query result identifier "R1" to the obtained query result and stores the obtained query result in the disk 134.

The query table generation module 128 matches the factorized character string "SELECT*FROM EMPLOYEE WHERE EMPNO=?," the execution plan identifier "P," the execution value list "2106," and the query result identifier "R1" and records in a format "{SELECT*FROM EMPLOYEE WHERE EMPNO=?, P, {2106, R1}}" in the query table.

When the query analysis module 111 receives a query "SELECT*FROM EMPLOYEE WHERE EMPNO=100" from a user, the character string generation module 112 generates a factorized character string "SELECT*FROM EMPLOYEE WHERE EMPNO=?" from the received query and transmits the factorized character string to the determination module 122.

The determination module 122 determines whether the factorized character string "SELECT*FROM EMPLOYEE WHERE EMPNO=?" is recorded in the query table. Since the factorized character string is recorded in the query table, the execution plan identifier management module 124 transmits the execution plan identifier "P" matching the factorized character string to the query request generation module 116. That is, in this case, since an execution plan with respect to the factorized character string is already generated, it is not needed to generate an additional execution plan.

Next, the query request generation module 116 generates a query request in a pair format, e.g., {P, 100}, using the execution plan identifier "P" and an execution value list "100" included in the query and transmits the query request to the query result obtaining module 126.

The query result obtaining module 126 determines whether a query result identifier matching the received query request exists in the query table. As a result of determination, since a query result identifier matching the query request does not exist but the execution plan corresponding to the execution plan identifier "P" is already stored in the memory 132, it is not needed to read the execution plan corresponding to the execution plan identifier "P" from the disk 134.

Then, the query result obtaining module 126 executes the execution plan stored in the memory 132 using the execution value list "100" to obtain a query result and transmits the query result to the client 110.

Next, the query result obtaining module 126 imparts a query result identifier "R2" to the obtained query result and stores the obtained query result in the disk 134.

Subsequently, the query table management module 128 adds data {100, R2} to the query table to update the query table in a form of {SELECT*FROM EMPLOYEE WHERE EMPNO=?, P, {2106, R1}, {100, R2}}.

When the query analysis module 111 receives a query "SELECT*FROM EMPLOYEE WHERE EMPNO=1206" again, the character string generation module 112 generates a factorized character string "SELECT*FROM EMPLOYEE WHERE EMPNO=?" from the query and transmits the factorized character string to the determination module 122.

The determination module 122 determines whether the factorized character string "SELECT*FROM EMPLOYEE WHERE EMPNO=?" is recorded in the query table. Since the factorized character string is recorded in the query table, the execution plan identifier management module 124 transmits the execution plan identifier "P" matching the factorized character string to the query request generation module 116. That is, in this case, since an execution plan with respect to the factorized character string is already generated, it is not needed to generate an additional execution plan.

Next, the query request generation module 116 generates a query request in a pair format, e.g., {P, 1206}, using the execution plan identifier "P" and an execution value list "1206" included in the query and transmits the query request to the query result obtaining module 126.

The query result obtaining module 126 determines whether a query result identifier matching the received query request exists in the query table. As a result of this determination, since the query result identifier R1 matching the query request {P, 1206} is recorded in the query table, the query result obtaining module 126 reads a query result corresponding to the query result identifier R1 from the disk 134, stores the query result in the memory 132, and provides the query result to the client 110.

Hereinafter, a database management method according to the present invention will be described with reference to FIG. 4.

Figure 4:
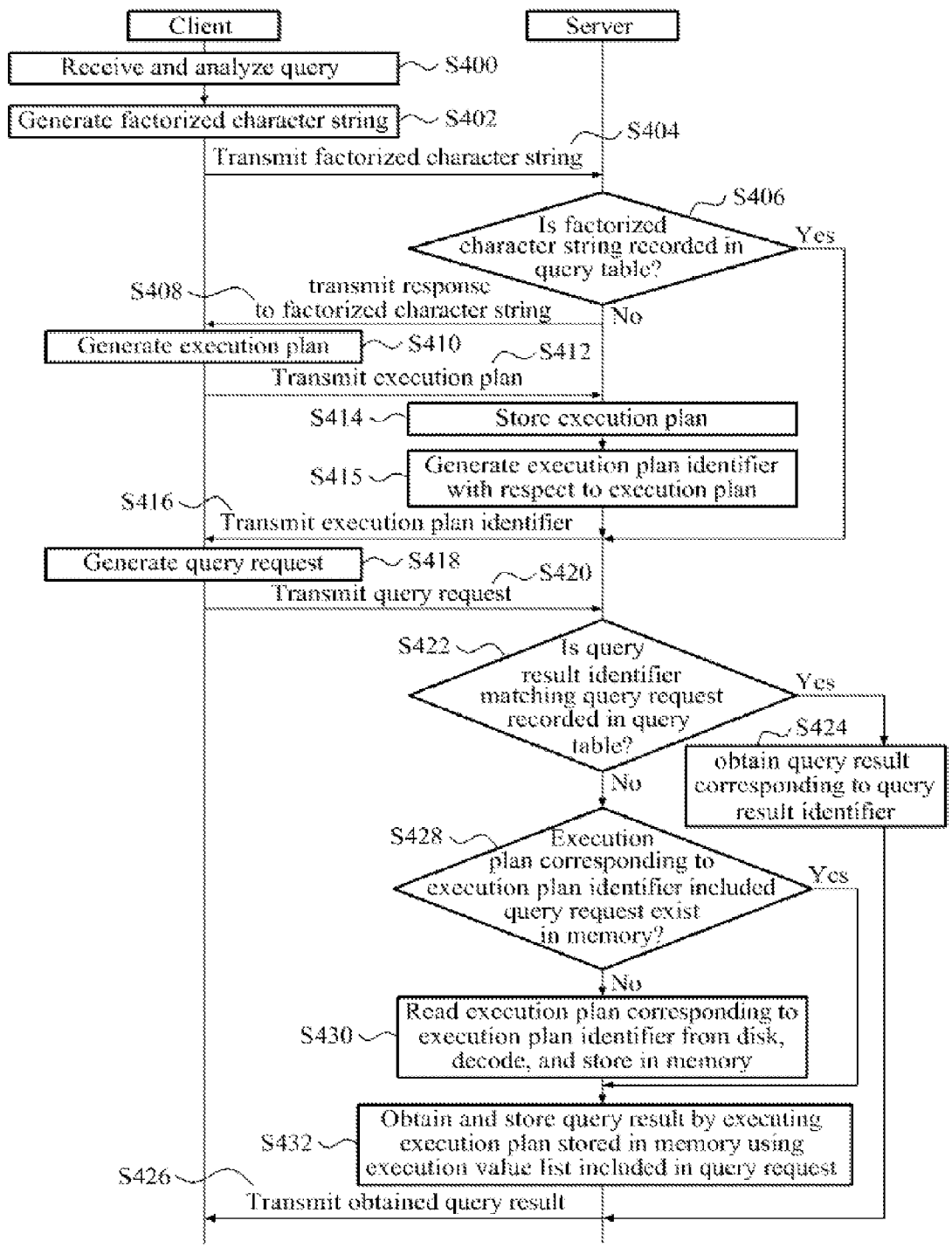
FIG. 4 is a flowchart illustrating a database management method according to an exemplary embodiment of the present invention.

FIG. 4 is a flowchart illustrating a database management method according to an exemplary embodiment of the present invention.

First, a client receives and analyzes a query from a user in operation S400. Here, the query may be written in an SQL sentence, and analysis of the query means a parsing and semantic check.

The client generates a factorized character string from the analyzed query in operation S402. In one exemplary embodiment, the character string generation module 112 may generate a factorized character string by converting an execution value list, such as constants or binding variables, of the query analyzed by the query analysis module 111 into a predetermined factor.

Then, when the client transmits the factorized character string to a server in operation S404, the server determines whether the factorized character string is recorded in a query table in operation S406.

As a result of determination, when the factorized character string is not recorded in the query table, the server transmits a corresponding response to the client in operation S408. In one exemplary embodiment, the server may transmit "Null" to the client as a response to transmission of the factorized character string.

The client generates an execution plan with respect to the factorized character string in operation S410 and transmits the generated execution plan to the server in operation S412. In one exemplary embodiment, the client may convert the execution plan into a stream format to transmit to the server.

The server stores the received execution plan in a disk in operation S414 and generates an execution plan identifier with respect to the stored execution plan in operation S415. In one exemplary embodiment, when the execution plan identifier is generated, the generated identifier may be recorded in the query table, matching the factorized character string.

Then, the server transmits the generated execution plan identifier to the client in operation S416.

In operation S406, when the factorized character string is recorded in the query table, the server transmits the execution plan identifier matching the factorized character string recorded in the query table to the client in operation S416.

When the execution plan identifier is transmitted from the server, the client generates a query request consisting of the execution plan identifier and the execution value list included in the query in operation S418 and transmits the generated query request to the server in operation S420. In one exemplary embodiment, when the query request is generated, the client may generate the execution plan identifier transmitted from the server and the execution value list include in the query in a pair format. In this way, the present exemplary embodiment considerably reduces the amount of information included in a query request when compared to a conventional method of transmitting an execution plan as a query request, thereby decreasing a network load occurring when retrieving enormous amount of data.

Next, when receiving the query request from the client, the server determines whether a query result identifier matching the query request exists in the query table in operation S422. As a result, when the query result identifier matching the query request exists, the server obtains a query result corresponding to the query result identifier from the memory or the disk in operation S424 and transmits the obtained query result to the client in operation S426.

Here, when the query result is obtained from the disk, the obtained query result is stored in the memory and then transmitted to the client.

In operation S422, when a query result identifier matching the query request does not exist in the query table, the server determines whether an execution plan corresponding to the execution plan identifier included in the query request is stored in the memory in operation S428.

As a result, when the execution plan corresponding to the execution plan identifier is not stored in the memory, the server reads an execution plan corresponding to the execution plan identifier from the disk and stores the execution plan in the memory via decoding in operation S430. Then, the server executes the execution plan stored in the memory using the execution value list included in the query request to obtain a query result and stores the query result in the disk in operation S432.

When storing the obtained query result in the disk, the server may generate a query result identifier to identify the query result and record the query result identifier in the query table, matching the query request. Then, the server transmits the obtained query result to the client in operation S426.

In operation S428, when an execution plan corresponding to the execution plan identifier is stored in the memory, the server executes the execution plan stored in the memory using the execution value list included in the query request to obtain a query result and stores the obtained query result in the disk in operation S430.

When storing the obtained query result in the disk, the server may generate a query result identifier to identify the query result and record the query result identifier in the query table, matching the query request. Then, the server transmits the obtained query result to the client in operation S426.

The above-described database management method according to exemplary embodiments the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

Examples of computer-readable media include magnetic media such as hard disks, floppy disks, and magnetic tape; optical media such as CD ROM disks and DVD; magneto-optical media such as floptical disks; and hardware devices that are specially configured to store and perform program instructions, such as read-only memory (ROM), random access memory (RAM), flash memory, and the like. The media may also be a transmission medium such as optical or metallic lines, wave guides, and the like, including a carrier wave transmitting signals specifying the program instructions, data structures, and the like.

Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

It will be apparent to those skilled in the art that various modifications and variation can be made in the present invention without departing from the spirit or scope of the invention.

For example, although the database management system according to the above exemplary embodiment consists of a client and a server, a client and a server may be configured as one physical server, some elements of a client may be included in a server, or some elements of a server may be included in a client.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

The invention claimed is:

1. A method using a device comprising at least one processor for managing a database, the method comprising:
   receiving, using at least one processor, a first query from a user;
   generating, using the at least one processor, a factorized character string based on the first query, the factorized character string being generated by converting at least one execution value of a character string of the first query into a desired factor;
   transmitting, using the at least one processor, the factorized character string to a server;
   receiving, using the at least one processor, an execution plan identifier associated with the factorized character string from the server, the execution plan identifier identifying an execution plan, stored on the server, equivalent to the factorized character string;
   generating, using the at least one processor, a second query request including the execution plan identifier and an execution value list associated with the first query, the second query request being in a pair format;
   transmitting, using the at least one processor, the second query request to the server;
   determining, using the at least one processor, whether a query result associated with the second query is stored on the server, the determining based on at least the execution plan identifier and the execution value list;
   receiving, using the at least one processor, a query result corresponding to the second query request from the server, wherein when the query result corresponding to the second query request is determined to be stored on the server, the receiving includes receiving the stored query result from the server;
   generating, using the at least one processor, an execution plan with respect to the factorized character string in response to a response to the factorized character string being received from the server; and transmitting, using the at least one processor, the generated execution plan to the server, before the receiving of the execution plan identifier.

2. The method of claim 1, wherein the factorized character string is generated by converting the execution value list included in the second query request into a desired factor.

3. The method of claim 1, wherein the response to the factorized character string is received from the server when in response to the execution plan identifier with respect to the factorized character string matching the factorized character string is not being stored.

4. The method of claim 3, wherein
the execution plan corresponding to the execution plan identifier is obtained directly from a memory, or obtained by decoding an execution plan in a stream format stored in a disk in response to a query result identifier matching the second query request not being stored.

5. The method of claim 1, wherein
the receiving of the query result includes obtaining the query result corresponding to a query result identifier from a memory of the server or a disk; and
the receiving of the query result includes receiving, from the server, the query result obtained by executing the execution plan corresponding to the execution plan identifier using the execution value list in response to the query result identifier matching the second query request not being stored.

6. A non-transitory computer-readable recording medium comprising computer readable instructions, which when executed by at least one processor, configures the at least one processor to:
receive a first query from a user;
generate a factorized character string based on the first query, the factorized character string being generated by converting at least one execution value of a character string of the first query into a desired factor;
transmit the factorized character string to a server;
receive an execution plan identifier associated with the factorized character string from the server, the execution plan identifier identifying an execution plan, stored on the server, equivalent to the factorized character string;
generate a second query request including the execution plan identifier and an execution value list associated with the first query, the second query request being in a pair format;
transmit the second query request to the server;
determine whether a query result associated with the second query is stored on the server, the determination based on at least the execution plan identifier and the execution value list;
receive a query result corresponding to the second query request from the server, wherein when the query result corresponding to the second query request is determined to be stored on the server, the receiving includes receiving the stored query result from the server;
generate an execution plan with respect to the factorized character string in response to a response to the factorized character string being received from the server; and
transmit the generated execution plan to the server, before the receiving of the execution plan identifier.

7. A system configured to manage a database, the system comprising:

a memory having computer readable instructions stored thereon; and
at least one processor configured to execute the computer readable instructions to,
receive a first query from a user,
generate a factorized character string based on the first query, the factorized character string being generated by converting at least one execution value of a character string of the first query into a desired factor,
transmit the factorized character string to a server;
receive an execution plan identifier associated with the factorized character string from the server, the execution plan identifier identifying an execution plan, stored on the server, equivalent to the factorized character string,
generate a second query request including the execution plan identifier and an execution value list associated with the first query, the second query request being in a pair format,
transmit the second query request to the server,
determine whether a query result associated with the second query is stored on the server, the determination based on at least the execution plan identifier and the execution value list,
receive a query result corresponding to the second query request from the server, wherein when the query result corresponding to the second query request is determined to be stored on the server, the receiving includes receiving the stored query result from the server;
generate an execution plan with respect to the factorized character string in response to a response to the factorized character string being received from the server, and
transmit the generated execution plan to the server, before the receiving of the execution plan identifier.

8. The system of claim 7, wherein the at least one processor is configured to generate the factorized character string by converting the execution value list included in the second query into a desired factor.

9. The system of claim 7, wherein the response to the factorized character string is received from the server when in response to the execution plan identifier associated with the factorized character string matching the factorized character string is not being stored.

10. The system of claim 7, wherein the at least one processor is further configured to:
receive a response to the factorized character string from the server in response to the factorized character string not being stored in a memory of the server; and
receive a new execution plan identifier corresponding to the factorized character string from the server.

11. The system of claim 7, wherein the server is configured to:
obtain a query result corresponding to a query result identifier from a memory of the server or a disk to provide the query result to the at least one processor in response to the query result identifier matching the second query request being stored; and
transmit, to the at least one processor, the query result obtained by executing the execution plan corresponding to the execution plan identifier using the execution value list in response to the query result identifier matching the second query request not being stored.

* * * * *